(12) United States Patent
Zefira

(10) Patent No.: US 6,598,010 B2
(45) Date of Patent: Jul. 22, 2003

(54) METHOD FOR ACHIEVING ACCURATE MEASUREMENT OF TRUE WEIGHT

(76) Inventor: Uri Zefira, P.O. Box 241, 15241 Kfar Tavor (IL)

(*) Notice: Subject to any disclaimer, the term of this patent is extended or adjusted under 35 U.S.C. 154(b) by 0 days.

(21) Appl. No.: 09/901,586

(22) Filed: Jul. 11, 2001

(65) Prior Publication Data

US 2003/0014214 A1 Jan. 16, 2003

(51) Int. Cl.⁷ ................................................ G01G 19/03
(52) U.S. Cl. ..................... 702/173; 702/101; 702/174; 73/1.13; 177/139; 177/141
(58) Field of Search .................. 702/173, 174, 702/175, 145, 101; 177/25.11, 136, 139, 199, 141; 73/1.13

(56) References Cited

U.S. PATENT DOCUMENTS 5,178,226 A * 1/1993 Bowman et al. ............ 177/139
5,970,435 A * 10/1999 Ito ............................. 701/59
6,002,090 A * 12/1999 Johnson et al. ............. 177/136

* cited by examiner

Primary Examiner—Kamini Shah
Assistant Examiner—Hien Vo
(74) Attorney, Agent, or Firm—Mark M. Friedman

(57) ABSTRACT

The present invention is a method for achieving accurate measurement of true weight of a load by use of a weight measuring device which has the ability to be tilted by the operator about an axis, such as, but not limited to, a scale which is built into a forklift vehicle. The accurate measurement of true weight is achieved by tilting the load through a range of angles of inclination that includes horizontal, about an axis running transverse to the forklift truck. Load force data from the weight measuring device is sent to a processor as the load is tilted. The processor filters out "noise" and uses the highest load force reading to calculate the true weight of the load. The present invention is further able to use the information obtained from the weight measuring device to determine the angle of inclination of the load at any given time.

18 Claims, 5 Drawing Sheets

METHOD FOR ACHIEVING ACCURATE MEASUREMENT OF TRUE WEIGHT

FIELD AND BACKGROUND OF THE INVENTION

The present invention relates to a method for achieving accurate measurement of the true weight of a load, and in particular, it concerns achieving the accurate measurement of true weight by use of a weight measuring device in conjunction with a load bearing structure, the load bearing structure having the ability to be tilted by the operator, such as, but not limited to, a scale which is built into a forklift truck, or being tilted as a result of natural occurrences, such as the tipping of a ship, which is caused by waves.

It is known that much of the shipping in the world today is done using pallets as transportation platforms. A loaded pallet may be moved using various types of pallet carriers or forklift devices, usually having one or two tines, which are inserted under the pallet. These forklift devices can be equipped with a built-in scale for weighing the loads on the pallet. Scales for this purpose utilize load cells, which measure the forces applied to them in a direction of measurement. The tines or carrying platform of a forklift truck may be tilted by the operator for purposes of stability.

It is further known that some loads have to be transported in a level position, and some loads have a limited tolerance for change in the angle of transportation. This would be true of loads which are very tall, or of containers whose contents may shift and cause instability. In many cases, these limited tolerances are impossible to judge by sight, and may be too small to be monitored by a device such as a spirit level, which works well for determining "level," but whose unit of measure beyond that, is inappropriate.

It is further known that in order for a weighing scale to accurately measure the weight of an object, it must be level, that is to say, perfectly horizontal. The scale must be level because, if the load cell is at an angle to the vertical forces applied to it, only the component of the force being applied in the load cell's direction of measurement (the force x the cosine of the angle) will be measured.

There is further known a scale that utilizes inclinometers and a processor in conjunction with a load cell. The processor uses information from the load cell (amount of force) and the inclinometers (angle of load from horizontal) to determine the true weight of the load. While effective, this scale incurs added cost as a result of the added inclinometers and may suffer reliability problems due to the number of complex components.

There is therefore a need for a method that can achieve accurate measurement of true weight without the need for dedicated inclination measuring elements, thereby rendering the system simpler, more reliable and cheaper, and that can accurately determine and display the angle of a load at any given time as it is being transported.

SUMMARY OF THE INVENTION

The present invention is a method for achieving accurate measurement of the true weight of a load.

According to the teachings of the present invention, a weight measuring device is used in conjunction with a load bearing structure.

According to a further teaching of the present invention, the load bearing structure is configured so as to tilt the plane that is represented by the top surface of the weight measuring device about an axis referred to as the "primary axis", such as, but not limited to, a load bearing structure of a forklift truck, which has a built-in scale.

According to a further teaching of the present invention, the load bearing structure is tilted as a result of natural occurrences, such as the tipping of a ship, which are caused by waves.

According to a further teaching of the present invention, the plane is tilted about the primary axis through a range of angles of inclination so that a line in the plane, which is perpendicular to the primary axis, passes through horizontal.

According to a further teaching of the present invention, the load force data obtained by the weight measuring device during the tilting process is sent to a processor unit.

According to a further teaching of the present invention, the true weight of the load is calculated using the highest load force reading received from the weight measuring device.

According to a further teaching of the present invention, prior to tilting the plane about the primary axis, the plane is rotated about a second axis referred to as the "secondary axis," which is perpendicular to the primary axis, until a line in the plane, which is perpendicular to the secondary axis, is brought to horizontal, and the resulting highest load force reading is the true weight of the load.

According to an alternate teaching of the present invention, the inclination of the plane, in relation to horizontal about the secondary axis, is measured by use of an inclinometer and the resulting data is used, in conjunction with the data from the weight measuring device, to calculate the true weight of the load.

According to a further teaching of the present invention, the data is sent to the processor, during the tilting process, at a rate that is fast enough to obtain all necessary load force data.

According to a further teaching of the present invention, the true weight is displayed by means of a display unit.

According to a further teaching of the present invention, the subsequent inclination of the plane is determined as a function of the true weight and the subsequent data from the weight measuring device.

Additionally, according to a further teaching of the present invention, there is provided a method for determining the angle of inclination of a load that is being supported by a weight measuring device in conjunction with a load bearing structure.

According to a further teaching of the present invention, an accurate measurement of the true weight of the load is obtained.

According to a further teaching of the present invention, the current load force data from the weight measuring device is sent to a processor.

According to a further teaching of the present invention, the angle of the load is calculated as a function of the current load force data and the true weight of the load.

According to a further teaching of the present invention, the accurate measurement of the true weight of the load is obtained while the load is positioned on the weight measuring device allowing the necessary load force data to be sent directly to the processor.

According to a further teaching of the present invention, the accurate measurement of the true weight of the load is measured prior to positioning the load on the weight measuring device, and the true weight data is manually entered into the processor.

According to a further teaching of the present invention, the angle of inclination is displayed by means of a display unit.

Additionally, according to a further teaching of the present invention, there is provided a method for achieving accurate measurement of true weight of a load, using a weight measuring device in conjunction with a load bearing structure, the load bearing structure being in a state of motion so as to tilt the plane that is represented by the load bearing surface of the weight measuring device about a primary axis, the method comprising: placing the load on the weight measuring device; sending load force data, which is obtained by the weight measuring device as the plane tilts about the primary axis through a range of angles of inclination so that a line in the plane that is perpendicular to the primary axis passes through horizontal, to a processor unit; and calculating the true weight of the load using the highest value of the load force data received from the weight measuring device.

According to a further teaching of the present invention, the state of motion is a result of waves, which cause the tipping movement of a ship.

According to a further teaching of the present invention, the inclination of said plane, in relation to horizontal, about a secondary axis is measured by use of an inclinometer, the resulting data being used, in conjunction with the load force data from the weight measuring device, to calculate the true weight of the load.

According to a further teaching of the present invention, the data is sent to the processor substantially continuously.

According to a further teaching of the present invention, the true weight is displayed by means of a display unit.

According to a further teaching of the present invention, subsequent inclination of the plane is determined as a function of the true weight and subsequent data from the weight measuring device.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
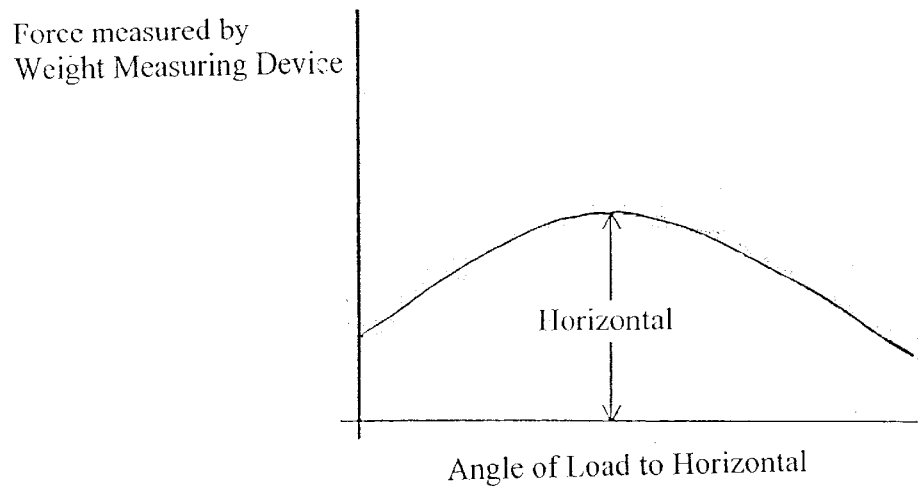
FIG. 1 is a graph showing the relationship between the force measured by a weight measuring device and the angle of the load to horizontal.

The present invention relates to a method for achieving accurate measurement of the true weight of a load by use of a weight measuring device in conjunction with a load bearing structure, the load bearing structure having the ability to be tilted by the operator, such as but not limited to, a scale which is built into a forklift truck, or being tilted as a result of natural occurrences, such as, but not limited to, the tipping of a ship, which is caused by waves.

By way of example, let us discuss the present invention in use with a forklift truck that has a weight measuring device built into the tines of the load bearing structure. The tines of the load bearing structure of a forklift truck are ridged and essentially parallel, and the top surfaces, which are the top surface of the built-in weight measuring device, roughly represent a plane. Once the load is lifted by the load bearing structure, the operator tilts the load bearing structure through a range of angles of inclination, which includes horizontal. This would rotate the plane about an axis, referred to as the "primary axis," which is transverse to the forklift truck. If the load is leaning toward the rear of the forklift truck when it is lifted off the ground, the operator will tilt the load bearing structure until the load is leaning toward the front of the forklift truck. As the load is tilted from a backward inclination to a frontward inclination, the angle of inclination will pass though horizontal. The force of the load measured by the weight measuring device will be highest when the inclination of the load is horizontal. As the load is tilted through the range of inclination from front to back, the weight measuring device sends load force data to the processing unit at a substantially constant rate, which is defined as a rate that is fast enough to obtain all necessary load force data. Typically, for a forklift truck, a frequency of 10 Hz would be an adequate rate. The processing unit receives the data, filters any "noise" caused by such things as static and vibrations, and determines the highest load force reading. This highest load force reading is then used to calculate the true weight of the load.

The plane represented by the top surface of the tines may be inclined about a secondary axis, which is longitudinal to the forklift truck. That is, it may be tilted to one side or the other. To correct this, prior to proceeding with the tilting process mentioned above, the forklift truck operator may position the forklift truck so as to bring the plane to horizontal about the secondary axis. The horizontal position may be indicated by any number of prior art means, a spirit level being one example. When the plane is horizontal about the secondary axis during the tilting process, the highest load force reading is the true weight of the load.

Alternately, either the load bearing structure or the weight measuring device may be equipped with an inclinometer. The processor uses data from the inclinometer in conjunction with the load force data to compensate for any side inclination during calculation of the true weight of the load, typically, by employing the measured force divided by the cosine of the angle of inclination.

Additionally, according to certain preferred implementations, the processor preferably uses subsequent load force data in conjunction with the true weight to calculate the angle of inclination of the load at any given time, typically, subsequent weight divided by true weight equals the cosine of the angle of inclination.

The principles and operation of achieving accurate measurement of true weight according to the present invention may be better understood with reference to the drawings and the accompanying description.

Referring now to the drawings, FIG. 1 is a graph showing the force of a load measured by a weight measuring device, plotted against the angle of the load to horizontal. As shown, the force increases as the angle approaches horizontal, is at maximum when the load is at horizontal, and decreases as the angle moves away from horizontal.

Figure 2:
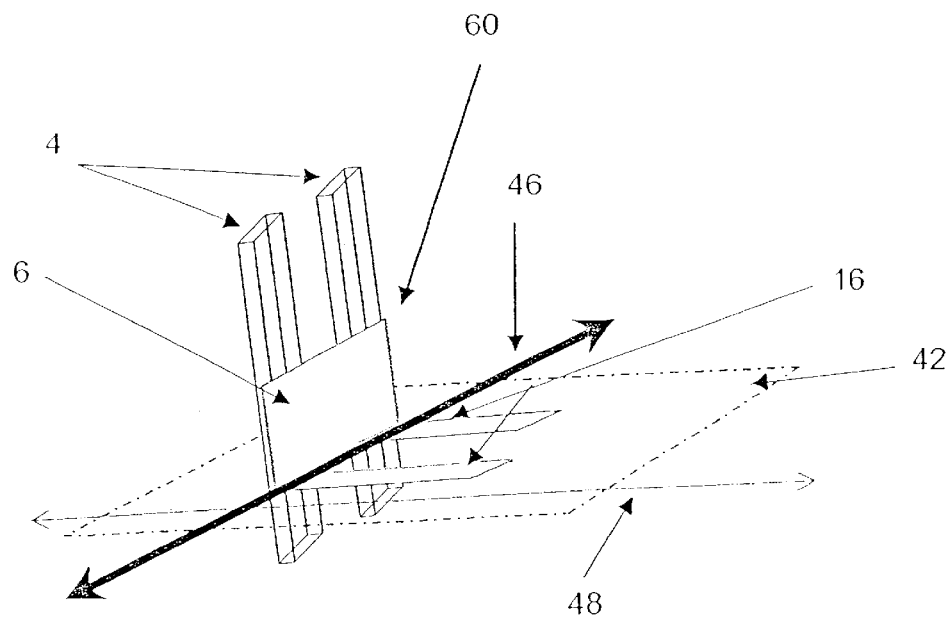
FIG. 2 is a schematic view of the lifting mechanism of a forklift truck, showing the basic principles of the present invention.

FIG. 2 shows the lifting mechanism 60 of a forklift truck, the masts 4, cross beam 6, and weighing platforms 16 mounted on the tines, as described below in FIG. 5a. The plane 42 that is represented by the top surface of the weighing platforms 16 may be tilted about a primary axis 46. As the plane is tilted, about the primary axis 46, through a range of inclination so that line 48, which is in the plane and is perpendicular to the primary axis 46, passes through horizontal, the weight measuring device sends data to the processor at a substantially constant rate. The highest weight reading received by the processor is used to calculate the true weight of the load.

Figure 3:
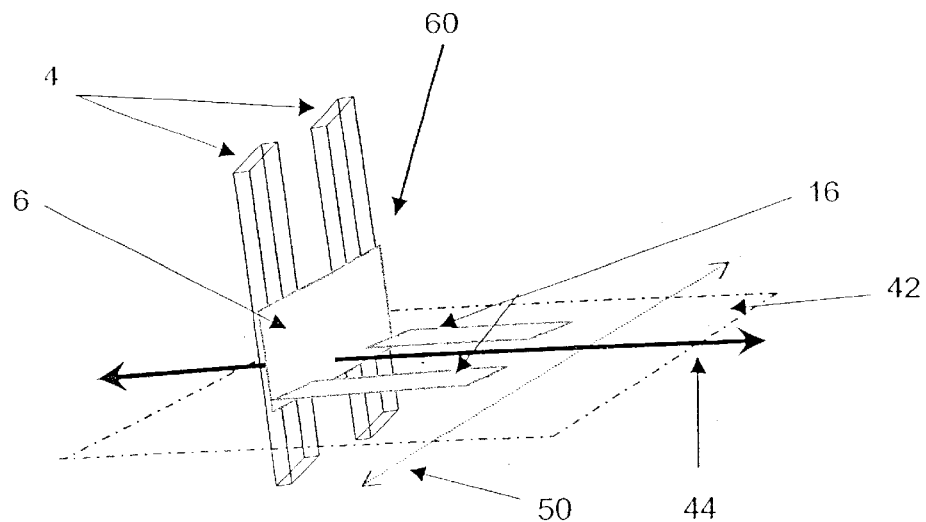
FIG. 3 and FIG. 4 are schematic views of the lifting mechanism of a forklift truck, showing alternative methods of compensating for side inclination.

FIG. 3 similarly shows the lifting mechanism 60 of a forklift truck, here showing a first preferred embodiment of the present invention that brings the plane 42 to horizontal, about the secondary axis 44. This is accomplished by tilting the lifting mechanism 60, so as to rotate the plane 42 about the secondary axis 44 until a line 50, which is in the plane and is perpendicular to the secondary axis, is horizontal.

Figure 4:
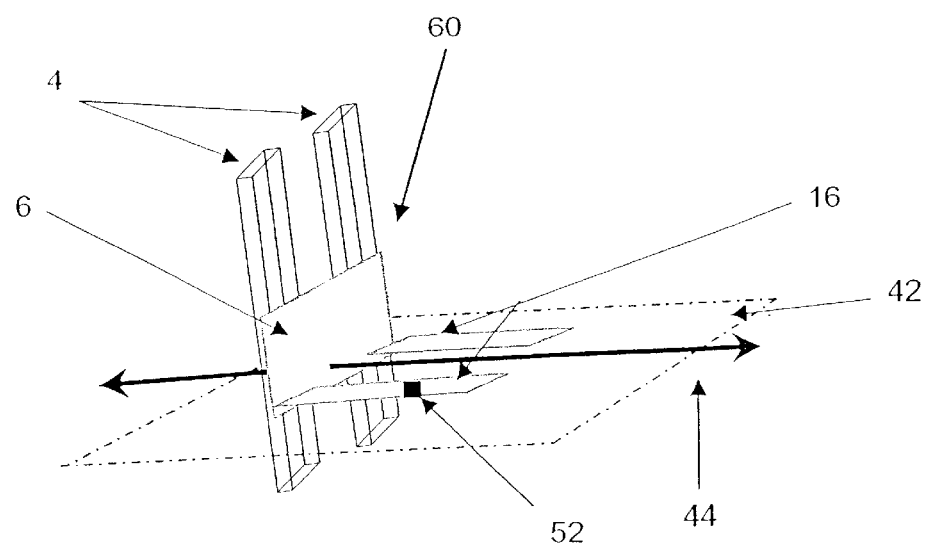

FIG. 4 similarly shows the lifting mechanism 60 of a forklift truck, here showing a second preferred embodiment of the present invention that achieves accurate measurement of true weight of a load by the use of an inclinometer 52, which measures the angle of inclination of the plane 42 about the secondary axis 44. The data from the inclinometer 52 is used in conjunction with the load force data to calculate the true weight of the load.

Figure 5A:
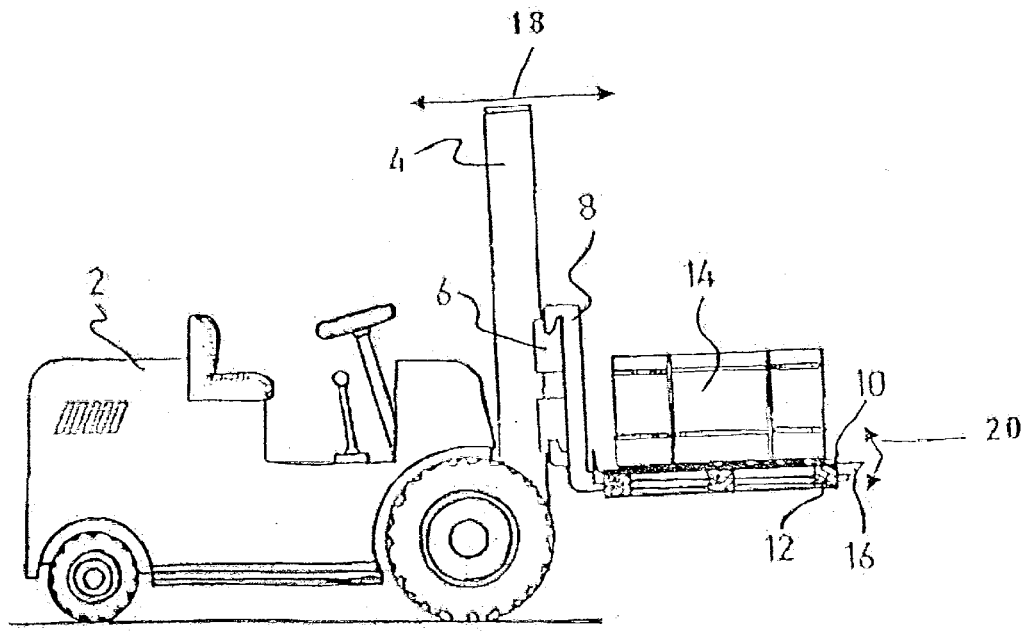
FIG. 5a, FIG. 5b, and FIG. 5c are schematic side-views of a forklift truck, showing the tilting process of present invention.

FIG. 5a shows a forklift truck 2 having a pair of vertical masts 4, which provide guide means for the vertical movement of a crossbeam 6. A pair of L-shaped tines 8 are attached to the crossbeam and are inserted under a pallet platform 10 in order to lift the pallet and the load 14 resting on the pallet. The tines are raised and lowered by the vertical movement of the crossbeam. Weighing platforms 16 are mounted on each of the tines. The two masts are hingedly attached to the forklift truck, which allows for change in the vertical attitude 18 of the masts. The tines are rigidly mounted to the masts so that a change in the vertical attitude 18 of the masts results in a change of the horizontal attitude 20 of the tines. The masts are shown tilted toward the rear of the forklift truck, several degrees from vertical, resulting in a tilt from horizontal of the tines 8, weighing platforms 16, and load 14.

Figure 5B:
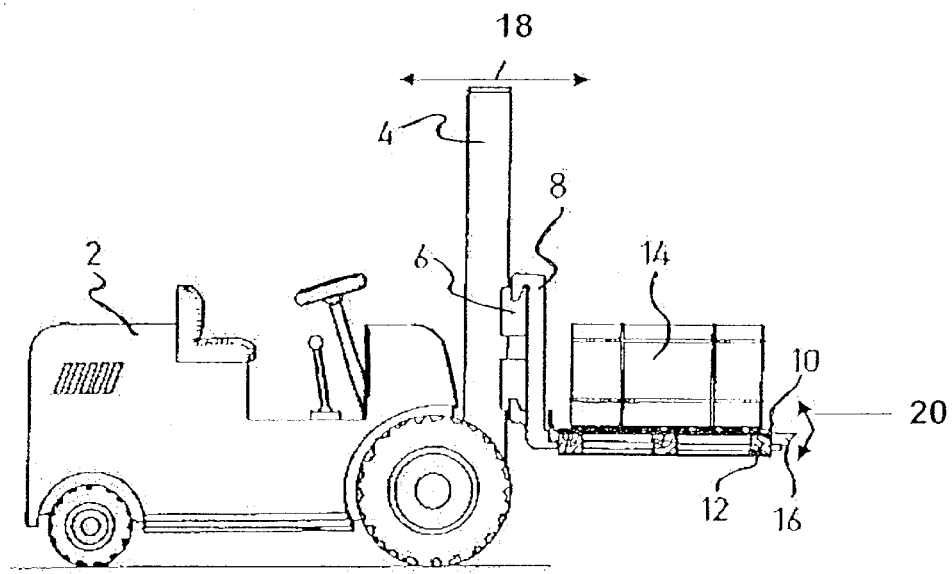

FIG. 5b is identical to FIG. 5a with the exception of a change in the vertical attitude 18 of the masts 4. The masts are shown in a position that results in the tines 8, weighing platforms 16, and load 14 being horizontal.

Figure 5C:
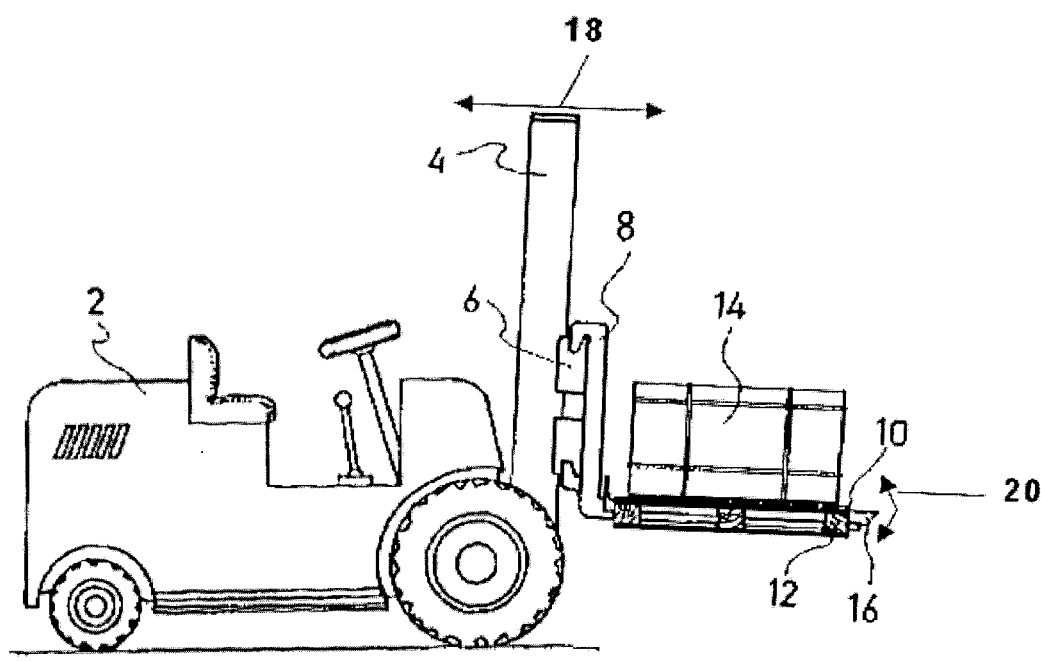

FIG. 5c is identical to FIGS. 5a and 5b with the exception of a change in the vertical attitude 18 of the masts 4. Here the masts are shown tilted toward the front of the forklift truck at several degrees from vertical, resulting in a change in the horizontal attitude 20 of the tines 8, weighing platforms 16, and load 14.

FIGS. 5a, 5b, and 5c in sequence, then, are a pictorial demonstration of the present invention. The load is shown being tilted from 5a a position inclined toward the rear of the forklift truck, through a range of angles of inclination, which includes 5b horizontal, to 5c a position inclined toward the front of the forklift truck. Note that an accurate weight measurement could also be achieved by tilting the load in a reverse sequence, front to back.

Figure 6:
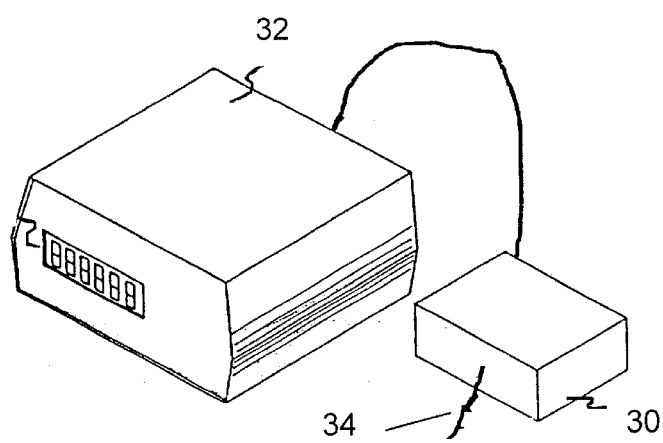
FIG. 6 is a schematic view of a preferred embodiment of a processor and display element of the present invention.

FIG. 6 shows a processor 30 and display element 32 of a preferred embodiment of the present invention. Cable 34 is attached to the weight measuring device.

Additionally, it should be understood that the principles of the present invention apply even when the tilting of the plane of the load bearing surface of the weight measuring device is a result of a natural occurrence, such as the tipping of a ship caused by the ocean waves.

Figure 7:
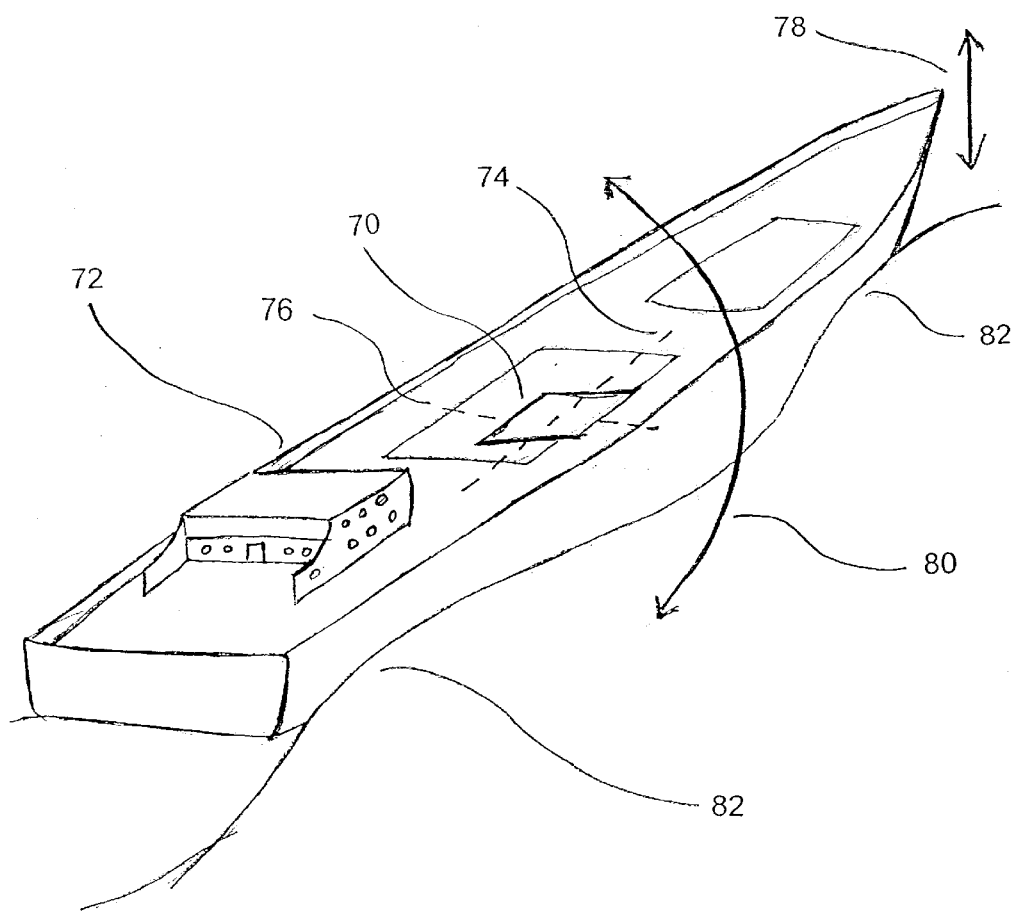
FIG. 7 is an isometric view of a ship at sea that is configured for use with a weight measuring device of the present invention.

FIG. 7 shows a ship 72 that is supporting a weight measuring device 70. The tilting of the plane of the weight bearing surface about the primary axis 74 is a result of the side-to-side tipping 80 of the ship caused by the waves 82. In some cases the longitudinal rocking motion 78 caused by the waves 82 is of such low amplitude so as to be considered zero for the purposes of the present invention. Therefore, rotation about the secondary axis 76 of plane of the weight bearing surface of the weight measuring device 70, the axis being transverse to the body of the ship, is also considered to be zero. In other cases, the amplitude of the rocking may be significant enough to impact the weighing process, however, the frequency may be low enough, in relation to the side-to-side tipping 80, to allow for compensation for the effect of the amplitude. That is, for example, if the frequency of the longitudinal rocking is ten minutes and the frequency of the side-to-side tipping is 45 seconds, the weighing process which requires one half of a side-to-side tipping cycle could be accomplished with negligible rotation about the secondary axis, caused by longitudinal rocking. So then, as a non limiting example, an accurate weight measurement can be achieved by: using a spirit level to indicate when the plane of the load bearing surface is horizontal along the side primary axis, or using an inclination sensor to compensate for inclination other than horizontal; as the ship tips from one side to the other, the load force data will be sent to the processing unit; and the processing unit will determine the true weight of the load. In situations where the frequency is high enough to cause rotation of the plane of the load bearing surface, about the secondary axis, during the weight measuring process, a more sophisticated system can be used. This system might including additional sensors and a processing unit, which can be programmed further, such as determining the frequencies of the rocking and the tipping and using the respective sinusoidal modulations in the calculations.

It will be appreciated that the above descriptions are intended only to serve as examples, and that many other embodiments are possible within the spirit and the scope of the present invention.

What is claimed is:

1. A method for achieving accurate measurement of true weight of a load, using a weight measuring device in conjunction with a load bearing structure, said load bearing structure being configured so as to tilt a plane that is represented by a load bearing surface of said weight measuring device about a tilt axis, the method comprising:

(a) tilting said plane and said load about said tilt axis through a range of angles and inclination, so that a line in the plane that is perpendicular to said tilt axis, passes through horizontal;

(b) sending load force data obtained by said weight measuring device during said tilting to a processor unit; and (c) calculating said true weight of said load using the highest value of said load force data received from said weight measuring device.

2. The method of claim 1, wherein said tilting is achieved through the actions of an operator.

3. The method of claim 1, wherein said tilting is a result of natural occurrences.

4. The method of claim 1, further comprising rotating said plane about a secondary axis, which is perpendicular to said primary axis, until a line in the plane, which is perpendicular to said secondary axis, is brought to horizontal, said rotation being accomplished prior to said tilting about said primary axis.

5. The method of claim 1, further comprising measuring inclination of said plane, in relation to horizontal, about said secondary axis by use of an inclinometer, resulting data being used, in conjunction with said load force data from said weight measuring device, to calculate said true weight of the load.

6. The method of claim 1, wherein said data is sent to said processor substantially continuously during said tilting process.

7. The method of claim 1, wherein said true weight is displayed by means of a display unit.

8. The method of claim 1, further comprising determining subsequent inclination of said plane as a function of said true weight and subsequent data from said weight measuring device.

9. A method for determining an angle of inclination of a load that is being supported by a weight measuring device in conjunction with a load bearing structure, the method comprising:

(a) obtaining an accurate measurement of true weight of said load;

(b) sending current load force data from said weight measuring device to a processor;

(c) calculating said angle of inclination of said load as a function of said current load force data and said true weight of said load.

10. The method of claim 9, wherein said true weight is obtained while said load is positioned on said weight measuring device allowing said load force data to be sent directly to said processor.

11. The method of claim 9, wherein said true weight is measured prior to positioning said load on said weight measuring device, and said true weight data is manually entered into said processor.

12. The method of claim 9, wherein said angle of inclination is displayed by means of a display unit.

13. A method for achieving accurate measurement of true weight of a load, using a weight measuring device in conjunction with a load bearing structure, said load bearing structure being in a substantially constant state of movement so as to tilt a plane that is represented by a load bearing surface of said weight measuring device about a tilt axis, the method comprising:

(a) placing said load on said weight measuring device;

(b) sending load force data, which is obtained by said weight measuring device as said plane and said load tilts about said tilt axis through a range of angles of inclination so that a line in the plane that is perpendicular to said tilt axis passes through horizontal, to a processor unit; and (c) calculating said true weight of said load using the highest value of said load force data received from said weight measuring device.

14. The method of claim 13, wherein said state of motion is a result of waves, which cause a tipping movement of a ship, said ship being said load bearing structure.

15. The method of claim 13, further comprising measuring inclination of said plane, in relation to horizontal, about a secondary axis by use of an inclinometer, resulting data being used, in conjunction with said load force data from said weight measuring device, to calculate said true weight of the load.

16. The method of claim 13, wherein said sending of said data is substantially continuously.

17. The method of claim 13, wherein said true weight is displayed by means of a display unit.

18. The method of claim 13, further comprising determining subsequent inclination of said plane as a function of said true weight and subsequent data from said weight measuring device.

* * * * *